Figure 1:
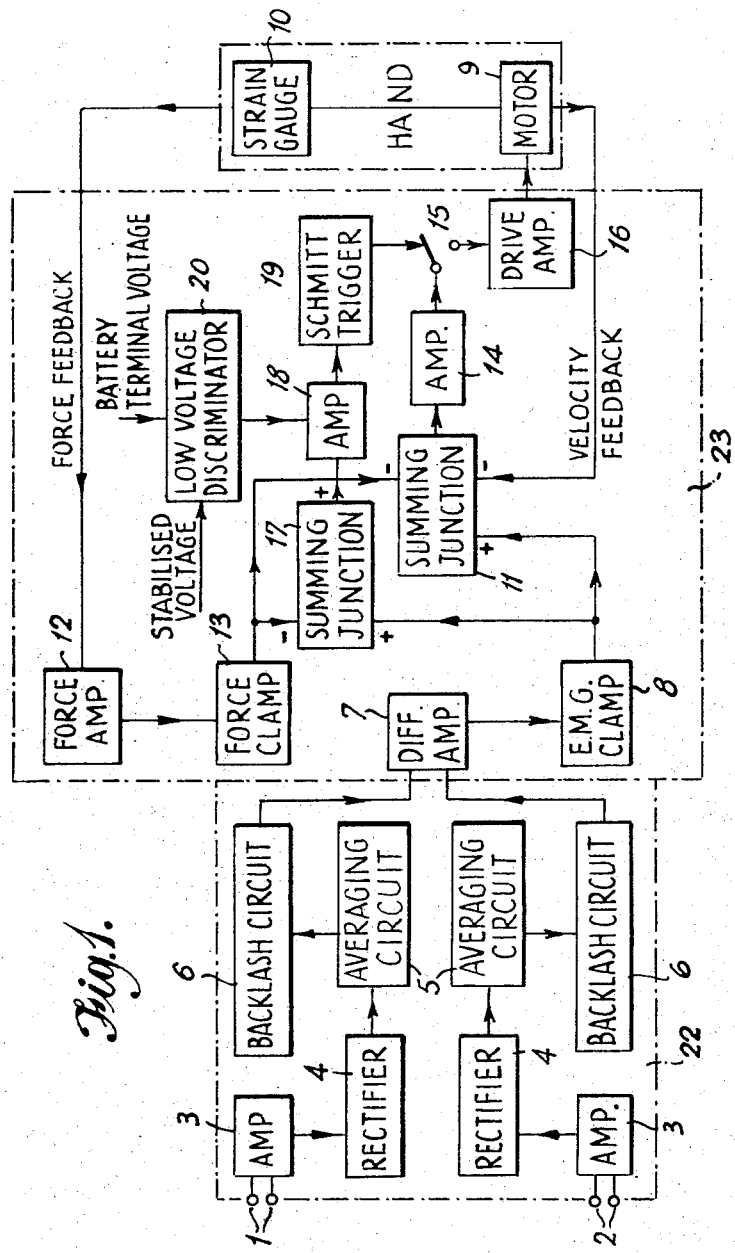

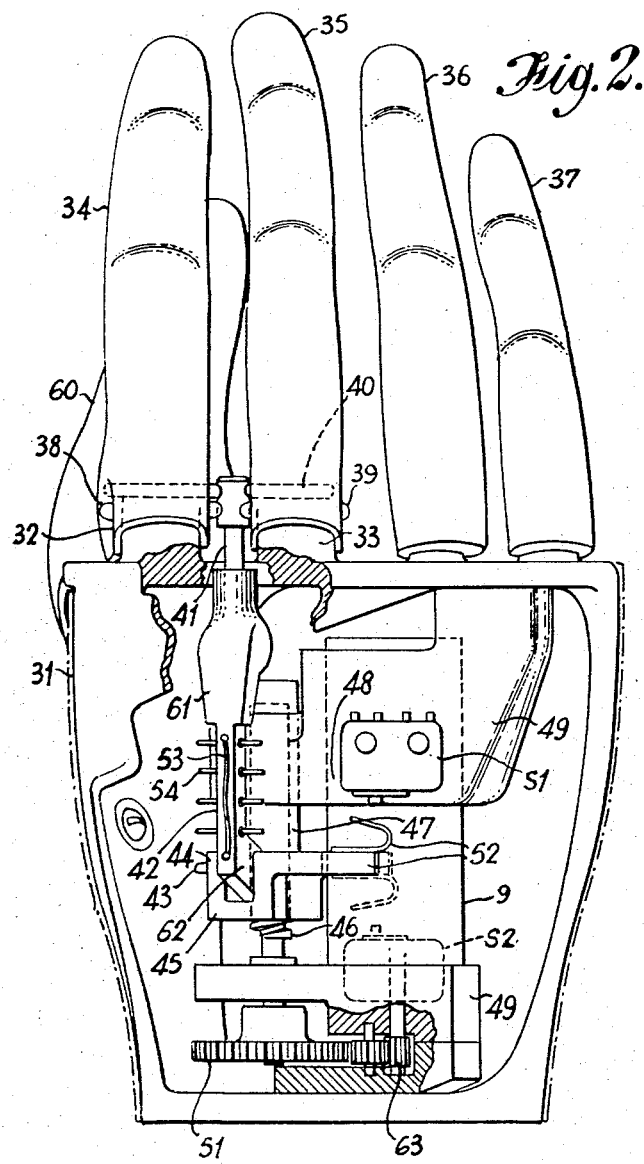

United States Patent Office 3,418,662
Patented Dec. 31, 1968

3,418,662
PROSTHETIC HAND WITH IMPROVED CONTROL SYSTEM FOR ACTIVATION BY ELECTROMYOGRAM SIGNALS
Alastair Howard Bottomley, Great Kingshill, Peter Robert Dennis Styles, Woking, Phillip Harvey Jilbert, Tadley, and John William Birtill and John Raymond Truscott, Reading, England, assignors to National Research Development Corporation, London, England, a British Corporation
Filed Mar. 29, 1966, Ser. No. 538,387
Claims priority, application Great Britain, Mar. 31, 1965, 13,661/65; Apr. 9, 1965, 15,204/65; Oct. 28, 1965, 45,639/65
8 Claims. (Cl. 3—1.1)

This invention relates to prosthetic devices and is concerned with devices which are controlled by electromyogram or EMG signals.

It is possible to obtain EMG signals from electrodes attached to the skin in the neighbourhood of muscles. Suitable muscles for controlling a prosthetic device in the form of an artificial hand are the flexor and extensor muscles in the forearm.

An artificial hand so controlled is described in "New Scientist" (No. 382) Mar. 12, 1964, at pages 668 to 671. Two sets of electrodes are attached respectively to the flexor and extensor muscles and the EMG signals obtained from these electrodes are amplified, rectified and smoothed and their difference taken to obtain a control signal which causes operation of a reversible electrical motor through a closed loop system. The loop utilises both velocity feedback and force feedback to modify the control signal and derive therefrom an error signal to actuate the motor.

It is an object of the present invention to provide a device which has an improved performance over the device described above particularly as regards unnecessary power consumption.

According to the present invention a prosthetic device comprises drive means operated by an error signal obtained from a closed loop feedback system in which a control signal derived from an EMG signal is modified by a velocity feedback signal from the drive means and a force feedback signal and in which the drive means is rendered inoperative when the difference between the force feedback signal and the control signal is less than a predetermined amount.

In carrying out the invention a pair of EMG signals may be obtained which are derived from opposing groups of muscles, e.g. the flexor and extensor muscles of the forearm. These signals are, after amplification, individually rectified and smoothed and their difference utilised as the control signal. Before taking the difference between the two signals it is desirable to include individual "backlash" circuits, which have hysteretic input/output characteristics and serve to eliminate the fairly large random fluctuations in the EMG signals which cannot be smoothed out without introducing an unnecessarily large time constant in the smoothing circuits.

Preferably, clamp circuits are provided to which the force feedback signal and the control signal are applied, after amplification if necessary, and which each serve to limit the maximum excursions of these signals in either direction to approximately equal amplitudes.

An artificial hand incorporated in a device embodying the invention includes a frame supporting at least one member mounted to be moveable relative to the frame for contacting an object, drive means in the form of a reversible electrical motor mounted rigidly on the frame, means for causing rotary motion of the motor to be converted into longitudinal motion of a rod means connected to move the member, and force feedback generating means comprising strain gauge means mounted on the rod means which provide an electrical signal corresponding to the longitudinal stress in the rod means.

Conveniently the rod means includes a beam portion terminated by lever portions adapted to cause bending of the beam portion when a longitudinal stress is applied to the rod means and the strain gauge means are mounted on the said beam portion.

In order that the invention may be more fully understood reference will now be made to the accompanying drawings in which:
FIG. 1 illustrates the invention in block diagrammatic form,
FIG. 2 is a part sectional view of an artificial hand that may be utilised in embodiments of the invention, and
FIGS. 3a and 3b and FIGS. 4a and 4b are detailed circuit diagrams of the arrangement shown in FIG. 1.

Referring now to FIG. 1, there is shown therein a control system for actuating an artificial hand. The control system is provided with two pairs of input electrodes, pair 1 being adapted to be attached to the forearm in the neighbourhood of the flexor muscles for closing the hand, and pair 2 being adapted to be attached to the forearm in the neighbourhood of the extensor muscles for opening the hand. Each electrode consists of a silver disc about one centimetre in diameter and the two electrodes of a pair are spaced apart some four to five centimetres over the relevant muscle. Considering the flexor electrodes 1, they are connected to an amplifier 3 the output of which is passed to a rectifier 4 which in turn feeds an averaging circuit 5. The output of averaging circuit 5 is fed to one input of a differential amplifier 7 through a backlash circuit 6. The backlash circuit 6 operates to change the value of its output only when the input thereto changes in amplitude by more than a predetermined proportion of the output of the backlash circuit.

The signals obtained from electrodes 2 are processed in similar circuits 3–5 inclusive and are then applied as the second input to differential amplifier 7.

The differential amplifier 7 produces an output proportional to the difference between its two inputs and the output is fed to EMG clamp circuit 8 which serves to limit the excursion of the output signal from differential amplifier 7 in either direction to a predetermined amplitude. The output of clamp circuit 8 constitutes a control signal, which, after being processed in a closed loop feedback system, is utilised to control an electric motor 9 The closed loop utilises velocity feedback from motor 9 and force feedback from a strain gauge 10 mounted in the artificial hand in a manner described in connection with FIG. 2. The velocity feedback signal is fed to a summing junction 11 while the force feedback signal is, after amplification in a force amplifier 12, applied to a force clamp circuit 13 which limits the maximum excursion of the force feedback signal to a similar value to that obtained from EMG clamp circuit 8, and thence to summing junction 11. The output of summing junction 11 is thus an error signal which consists of the value of the control signal obtained from EMG clamp circuit 8 less both the magnitude of the velocity feedback signal and the magnitude of the force feedback signal obtained from force clamp circuit 13. The error signal is amplified by amplifier 14 and after passing through a switch 15 is applied to a drive amplifier 16 operating motor 9.

In addition to the circuits so far described the outputs of EMG clamp circuit 8 and force clamp circuits 13 are taken to another summing junction 17 the output of which is amplified in an amplifier 18 and thence controls a Schmitt trigger circuit 19 the function of which is to open switch 15 and reset whenever the signal from amplifier 18 is less than a predetermined value.

The Schmitt trigger circuit 19 can also be reset when the terminal voltage of the battery falls below a predetermined amount by the provision of a low voltage discriminator 20 the output of which is applied to amplifier 18.

In the arrangement described in connection with FIG. 1 the individual EMG signals obtained from the flexor and extensor muscles respectively are, after amplification, rectification and averaging fed to separate backlash circuits such as circuit 6 which smooth out irregularities in the values of the EMG signals produced by the subject when trying to maintain constant muscle tension. The outputs of the backlash circuits are fed to a differential amplifier 7 which produces a signal the polarity of which is appropriate to the direction of movement required and the amplitude of which is proportional to the velocity or force required. This signal is fed through EMG clamp circuit 8, which has no effect until a predetermined maximum signal is obtained, and then through summing junction 11, amplifier 14 and drive amplifier 16 to motor 9 in the hand.

Force feedback is obtained from strain gauge 10 which measures the force applied in a manner described with reference to FIG. 2. In the absence of any strain in the fingers no signal is fed back through force amplifier 12 to summing junctions 11 and 17. Velocity feedback is obtained from motor 9 and since a tachogenerator is rather impractical in the limited space available in the hand, motor 9 is conveniently connected in a bridge arrangement which produces a signal proportional to the back EMF of the motor. In practice, since the stalled resistance of the motor is not constant and depends upon the position of the commutator on stalling, the bridge cannot be balanced to provide no feedback at the zero velocity condition. In order that this should not result in a net negative feedback which would reduce the gain to an unacceptable level the bridge is balanced so that in stalled conditions of the motor there is always a slight net positive feedback and instability is avoided by disabling drive amplifier 16 in the manner described below. In the absence of any disabling signal which would open switch 15 the motor operates under the control of velocity feedback when there is no force applied by the fingers and under the control of force feedback when the fingers grip an object. In this connection it will be realised that the mechanical linkage between the motor and fingers ensures that no slip occurs so that the fingers do not loose their grip when the motor is de-energised.

Summing junction 17, amplifier 18, low voltage discriminator 20 and Schmitt trigger 19 satisfy three important requirement all related to power economy. The first requirement is that in the absence of any net EMG signal the drive amplifier and motor should consume no power. This is particularly important as in the stalled condition velocity feedback is either zero or positive for the reason described above. Secondly, when the required force called for by the EMG signals is attained or at least within a small error $\delta F$ of the processed EMG signal the motor and drive amplifier need to be disabled. Thirdly under conditions of low voltage resulting from a discharged battery, when the maximum torque available from the motor is limited so that for large EMG signals the force feedback signal is insufficient to reduce the error signal to $\delta F$, then again the motor and drive amplifier need to be disabled.

The Schmitt trigger 19 resets to open switch 15 when the output from summing junction 17 is within $\pm\delta F$ and in converse fashion maintains switch 15 closed when the output from summing junction 17 is outside the limits of $\pm\delta F$. This is achieved by arranging that the Schmitt trigger is reset to open switch 15 and disable the drive amplifier when no output is obtained from summing junction 17 or when the magnitude of the output is within the limits $\pm\delta F$. There is also a controlled amount of hysteresis in the Schmitt trigger which permits stable operation of switch 15, and also allows for mechanical backlash in the gearing in the hand which changes the strain gauge signal when the motor torque is removed. The value of $\delta F$ is chosen so as to enable the motor to give its full torque at low velocity. This ensures that the motor is never energised by an error signal which it is incapable of correcting.

The Schmitt trigger also resets whenever the input to discriminator 20 falls below a predetermined value of voltage. In this connection it should be noted that the source impedance of a discharged battery is high so that a lower terminal voltage is produced under heavy load conditions which occur only when the motor is stalled.

EMG clamp circuit 8 serves to ensure that the control signal is limited to the maximum possible output of the motor even when large EMG signals are present. In addition the EMG clamp circuit 8 and force clamp circuit 13 are arranged to limit the EMG and force feedback signals so that the force amplifier cannot produce a signal larger than the clamped EMG signal. Thus when the maximum EMG signal is applied the error signal is zero even for a very large externally applied force. Accordingly, a heavy object may be lifted, subject to the breaking strain of the fingers, without the motor being energised and without the hand opening.

Referring now to FIG. 2 there is shown therein an artificial hand incorporating the drive motor 9 indicated diagrammatically in FIG. 1. The hand comprises a light alloy frame 31, shaped in outline like the palm of a hand, which has two stubs 32 and 33 to which are hinged hollow metal first and second fingers 34 and 35. The third and fourth fingers, 36 and 37 are of rubber and are provided for appearance only. A hinged thumb 60, which can be locked in either of two positions, is also provided. Fingers 34 and 35 are hinged by pins 38 and 39 which pass through the fingers near the upper or back surface thereof. Approximately in line with pins 38 and 39 but enar the lower or plam surface, the fingers are linked together by a pin 40 which passes through a hole in one end of a connecting rod 41. Linear movement of rod 41 towards the wrist causes the first and second fiingers 34 and 35 to pivot about pins 38 and 39 until their tips meet the top of thumb 60, enabling an object to be gripped between thumb and fingers. Artificial hands of the described kind in which rod 41 is actuated by a shoulder harness are commercially available. A spigot may be provided for connecting the hand at the wrist to an artificial forearm.

In the present hand rod 41 itself forms part of rod means comprising a beam portion 42 of enlarged rectangular cross-section connected to rod 41 via lever portion 61. Beam portion 42 extends back towards the wrist and terminates in a further lever portion 62 which is pivoted, by a pin 43, between cheeks 44 formed on a threaded nut 45. Nut 45 runs on a lead-screw 46 and includes a tubular portion 7 extending towards the fingers which is a sliding fit in a block 8 fastened to the frame. To a further block 49 fastened to the frame is secured a reversible electric motor 9 (Pullin Type O8PM) which drives a pinion 51 through a reduction gear train 63, pinion 51 being mounted on the end of lead-screw 46.

Nut 45 is restrained from turning by a pair of radical arms 52 which slidably embrace the smooth cylindrical casing of motor 9. (The second of the arms is hidden below the motor in the figure.)

Secured to the upper face of beam portion 42 by a suitable adhesive such as Araldite is a silicon resistance strain gauge 53 the ends of which are connected to terminals formed by transverse steel pins 54 which are insulated from beam portion 42 by tubular glass inserts (not shown) in which they are adhesively secured. Four such pins are shown to allow connections to be made to a second strain gauge (not shown) secured to the lower face of beam portion 42. Connection is made to the ends of pins 54 hidden behind beam portion 42 by extensible leads connected to a terminal strip mounted on the frame.

In operation the motor 9 is rotated in response to drive signals obtained from the control system and drives the lead-screw 46, thus moving the nut 45 towards or away from the fingers depending on the direction of rotation. The former movement causes the first and second fingers to open away from the thumb; the latter movement causes them to close towards the thumb. When, in closing, an object is gripped between thumb and fingers, or if in any other way a longitudinal stress is applied to rod 41, lever portions 61 and 62 apply bending moments to beam portion 42, whose resulting deformation produces changes in opposite senses in the resistances of the two gauges. The latter are connected in a bridge circuit to provide the froce feedback signal to the amplifier feeding the motor 9.

The maximum output from the strain gauges may be limited by limiting the possible degree of bending of beam portion 42. Such a limitation can be used as an alternative or in addition to the force clamp circuit 13. Furthermore limit switches may be provided in proximity to the beam portion 42 to switch off the drive to the motor 9 when a predetermined maximum permissible degree of strain has been applied to beam 42 in the direction which would increase the strain, while leaving the motor free to operate in the reverse direction.

A limit switch S1 operated by arm 52 is mounted on block 48 to stop the motor at the maximum permissible travel of nut 45 towards the fingers, and a similar switch S2 on the lower surface of block 49 limits travel towards the wrist.

In order to provide some force to work against when the fingers are opening, simulating the elastic properties of a real hand, a coil spring may be connected between the frame 31 and a point on finger 34 near the lower or palm surface to bias the fingers towards the closed condition. Alternatively, the elasticity of the plastic coating or glove can be used for this purpose.

Although the foregoing description relates to an artificial hand which simulates a real hand both in appearance and in movement of the fingers, the term "artificial hand" in this specification is intended to include other forms of substitute hand such as, for example, one in which the moveable members are the halves of a split hook hinged to close together. A "hand" of this kind is shown, for example, in New Scientist for Mar. 12, 1964, p. 671.

Figure 3A:
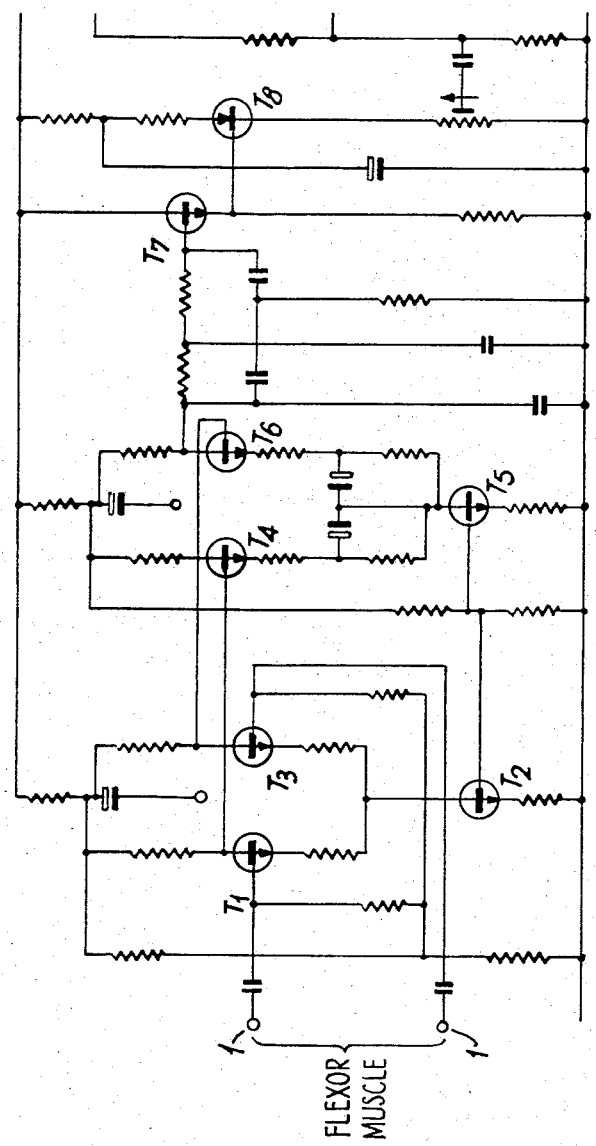
Figure 3B:
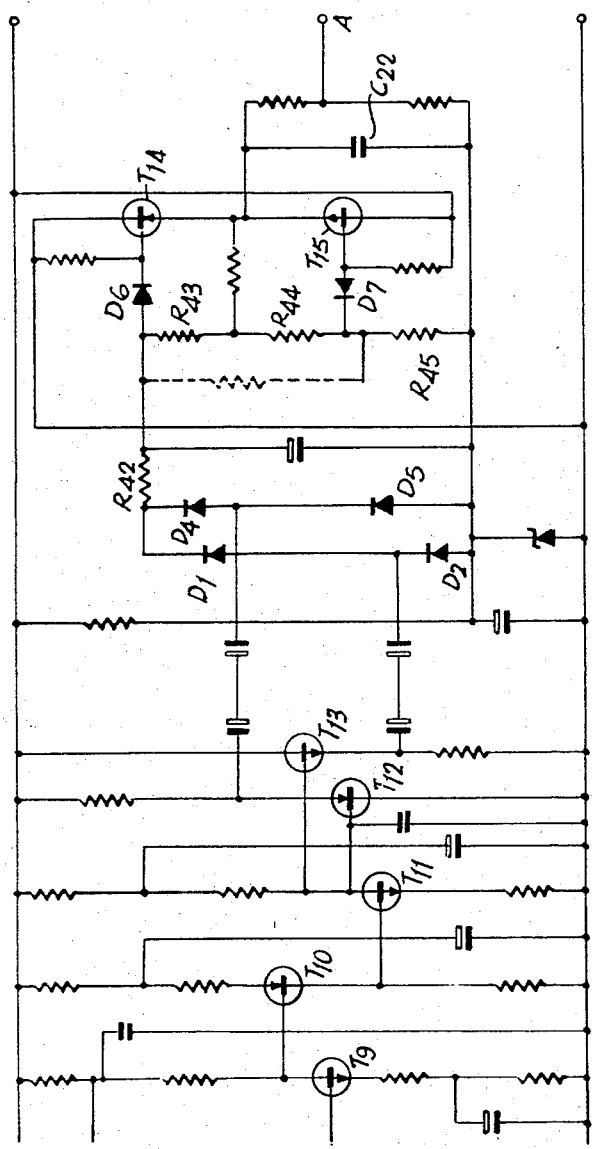

A detailed circuit diagram for the amplifier 3, rectifier 4, integrator 5 and backlash circuit 6 for the flexor muscle input which is described in general terms in FIG. 1, and is enclosed within the dotted rectangle 22, is shown in FIG. 3a and 3b which is a single circuit split into two halves for convenience. The corresponding circuits for the extensor muscle input are identical. To eliminate common-mode signals as far as possible, a balanced input signal from the two flexor electrodes is applied to a differential amplifier T1, T3 using low-current, low-noise transistors, and thence to a second similar differential amplifier T4, T6. Transistor T2 acts in a known manner as the common emitter resistor of T1 and T3. An unbalanced output signal is taken from T6, via a notch filter designed to filter out any 50 c./s. hum picked up from the mains, to an unbalanced amplifier comprising transistors T7 to T13. T12 and T13 provide a low impedance output to the voltage-doubling rectifier-integrator including diodes D1, D2, D4, D5, the output from which is applied to the backlash circuit formed by T14 and T15.

The function of this backlash circuit is to compare the input signal of value say $x$ applied to the potential divider chain formed by resistors R42, R43, R44 and R45 with the output signal of value say $y$ from capacitor C22. Whenever changes occur in the value of $x$, the value of $y$ remains constant unless or until the value of $x$ either becomes greater than a predetermined proportion of the value of $y$ or falls to less than a smaller predetermined proportion of $y$. Thus a constant ratio "backlash" or hysteresis effect is obtained which smooths out fluctuations in the value of $x$ without introducing an excessively long time constant.

The diodes D6 and D7 are inserted in the base input connections to transistors T14 and T15 to eliminate the non-linearity caused by the emitter-base threshold of the transistors, by providing an equal and opposite bias voltage.

Figure 4A:
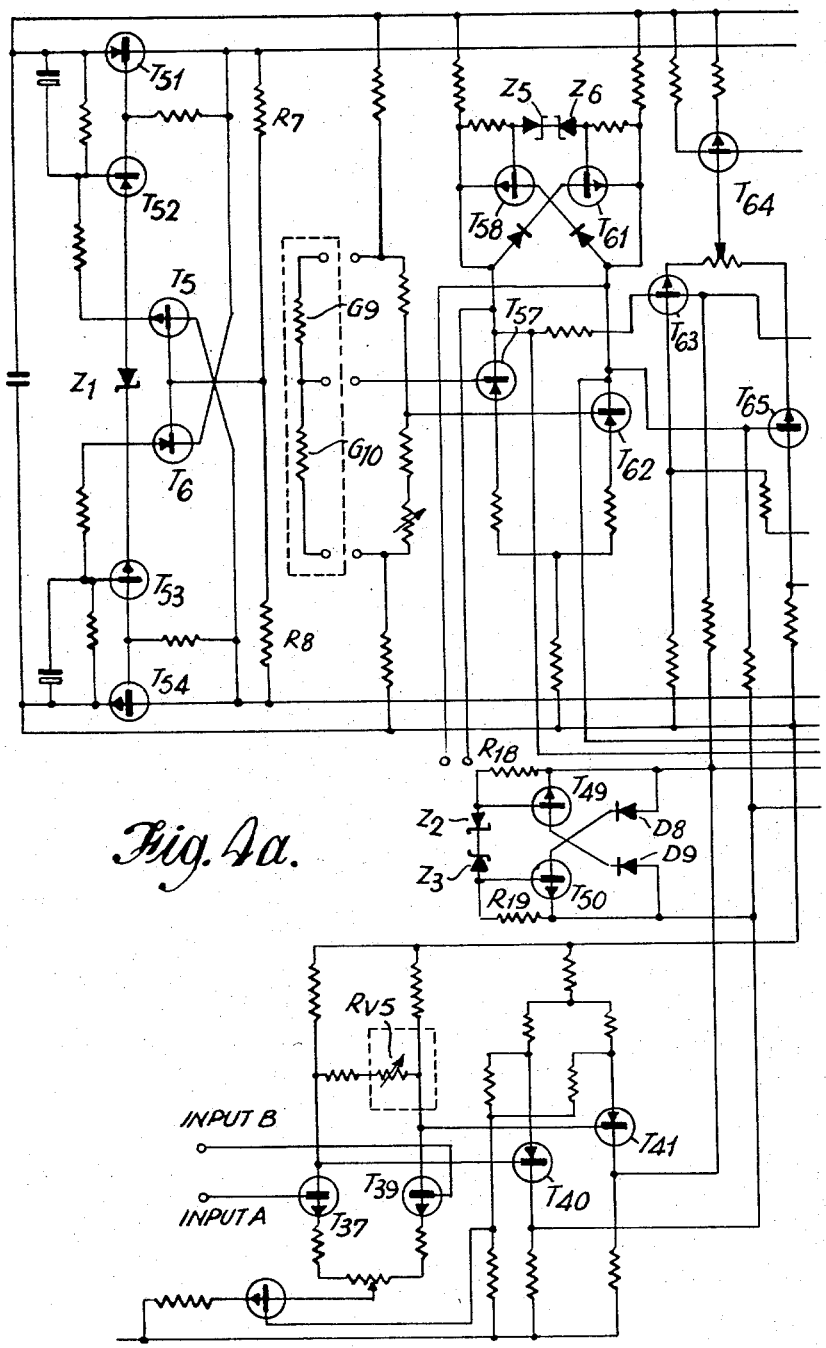
Figure 4B:
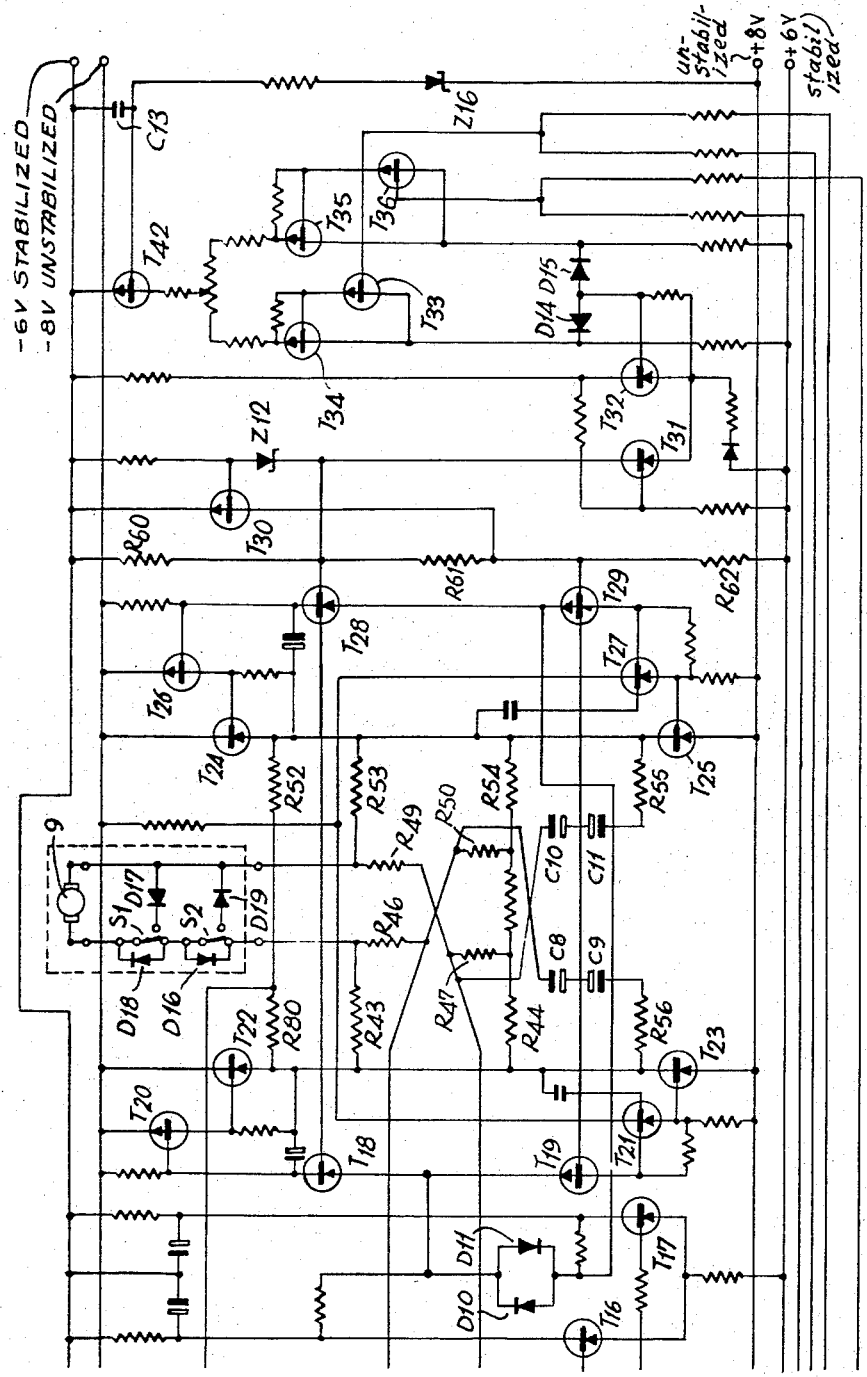

The output from the circuit illustrated in FIG. 3b at terminal A and a similar output obtained from a second identical circuit controlled by the extensor muscles, is fed to the circuit illustrated in FIGS. 4a and 4b at the two input terminals A and B. This circuit shows in detail the remaining part of FIG. 1 enclosed in the dotted rectangle 23.

The transistors T37 and T39 constitute a differential amplifier for the two inputs A and B and the output thereto is further amplified by transistors T40 and T41. Sensitivity control is provided by variable resistor RV5 adjustable by the user. It is normally set to full sensitivity but can be reduced for delicate work.

The output from T40, T41 is fed to an EMG clamp circuit comprising transistors T49, T50 and associated components. Assuming the signal polarity to be such that T50 emitter is positive relative to T49 emitter, the current through R19, Zener diodes Z2, Z3 and R18 can increase to a value of about 50μA, when the voltage across R18 and R19 is about 0.5 v. each and across Z2 about 2.5 v. (Z1 acting as an ordinary diode for this input polarity). The 0.5 v. across R18 brings silicon transistor T49 into conduction, shunting the Zener diode/resistor chain and preventing any further increase in the voltage between the emitters. T50 operates similarly for the other polarity of input. Diodes D8 and D9 prevent reverse bias being applied to the collectors of T50 and T49 respectively when these transistors are required to be non-conducting.

The force signal input from the strain gauges G9, G10 mounted in the manner described with reference to FIG. 2, is fed to a differential amplifier T57, T62 having a clamp circuit formed by T58, T61, etc., connected between the collectors. Zener diodes Z5 and Z6 are selected so that the force clamp circuit operates at an input about 0.10 v. higher than the EMG clamp circuit. This arrangement is preferred because the EMG clamp circuit may receive an input current of several times the value needed to effect clamping, and as the clamping circuit plateau has a significant slope, the clamped voltage can increase accordingly. If the force clamp were set to the same value, the motor would have to provide a correspondingly large signal to compensate, but this it is incapable of doing unless the normally operating force signal is derived at much below the maximum force obtainable from the motor, which is uneconomic. By setting the force clamp level slightly above the EMG clamp level, only a moderate additional force need be exerted by the motor to compensate for a many-fold increase in EMG input current above the clamping value.

The clamped EMG and force outputs are fed to summing junction 11 (FIG. 1) formed by the differential amplifier T63, T65, whose bases are virtual earths by virtue of the feedback to these bases from the motor drive amplifier T22–T25. This feedback also constitutes the motor velocity feedback which is mixed with the force and EMG signals. The output from T63, T65 is fed to the differential amplifier T16, T17 and the balanced output therefrom to the motor drive amplifier. The latter comprises transistors T18, T19 and T28, T29, to whose emitters the output of T16, T17 is applied. The outputs of these four transistors feed four grounded emitter amplifiers which include transistors T20, T21, T26, T27 and four germanium power transistors T22–25.

The arrangement is such that, depending on the polarity of the balanced signal from T16, T17, either T22 and T25 conduct with T23 and T24 cut off, or vice versa, thus controlling the direction of rotation of the motor 9.

The clamped EMG and force signals are also mixed at the bases of emitter-followers T33, T36 which feed the differential amplifier T34, T35, these bases forming summing junction 17. The output from T34, T35 is fed via diodes D14, D15 to a Schmitt trigger circuit T31, T32. This circuit is so biassed, in relation to the potentials of the T34, T35 collectors, that for signals above a threshold level determined by this potential and the characteristics of D14, D15, T32 is conducting and T31 is cut off. In this condition T30 is also cut off, and the current flowing in R60, R61, R62 provides bias conditions at the bases of T18, T19, T28, T29 which allow the latter transistors to be made conducting by appropriate signals from T16, T17. If the balanced output signal from T34, T35 falls below the threshold, either D14 or D15 ceases to conduct cutting off T32 and bringing T31 into conduction. The latter causes Zener diode Z12 to conduct which brings T30 into conduction. The current flowing through T30 and T31 causes the voltage across R61 to reverse in polarity, and this changes the bias conditions at the bases of T18, T19, T28, T29 so that the maximum signal obtainable from T16, T17 (which is limited by the oppositely-poled diodes D10, D11) is incapable of bringing these four transistors into conduction. Thus no power can be applied to the motor under these conditions.

A condition can exist in which, although all four power transistors T22–T25 are cut off, leakage through one or more causes a common-mode signal to be fed back from the balanced output bridge circuit R43, R44, R46, R47, R48, R49, R50, R53, R54, to the bases of T63, T65, which upsets subsequent operation of the circuit. To avoid this happening, a common-mode feedback signal is taken from the junction of R80, R52 to the base of T64 which forms the common emitter resistor of amplifier T63, T65. This feedback controls the common-mode (as opposed to differential) output of T63, T65 and via T16, T17 and the succeeding transistors, causes an equal and opposite leakage through the appropriate transistor pair (T23, T25 if the initial tendency was negative-going, T22, T24 if the initial tendency was positive-going) to restore the DC level of the double-bridge circuit.

Capacitors C8–C11 provide AC negative feedback which prevent any tendency to ratcheting in operation, i.e. ensure that the fingers move smoothly and not in successive jerks. Resistors R56 and R55 prevent the fingers tending to bounce when an object is gripped.

A condition can arise when the battery voltage has fallen appreciably in which the motor cannot produce sufficient force to provide a force feedback signal which balances the EMG signal. This can result in a large continuous signal being applied in an attempt to drive the motor harder, which could result in the power transistors burning out. To avoid this possibility, a low voltage discriminator (20, in FIG. 1) is provided comprising transistor T42 connected in the common omitter lead of T34, T35 and 12 v. Zener diode Z 16 connected between the unstabilised positive line via the base/emitter junction of T42 to the stabilised negative line. While the battery voltage remains high, Z16 conducts and holds T42 in conduction; when this voltage falls below a given level Z16 ceases to conduct and T42 is cut off, which in turn cuts off T34 and T35, brings T31 into conduction, and quenches the motor. Moreover the internal resistance of the battery causes the battery voltage to rise when the motor is quenched by the non-conduction of Z16, and this rise can bring Z16 into conduction again and remove the quench, the effect being regenerative. The introduction of C13 reduces the frequency of the resulting oscillation to a value at which it acts as a warning to the wearer that the battery voltage has fallen to a level at which replacement is needed.

T1 and T2 form a conventional series voltage stabiliser for the −6 v. stabilised line and T4 and T3 a corresponding stabiliser for the +6 v. stabilised line. The reference voltage for both stabilisers is the Zener diode Z1, which is referred via the emitter-followers T5 and T6 to the centre-tap of the potentiometer formed by R7 and R8 connected across the +8 v., −8 v. unstabilised supply, i.e. across the batteries. This arrangement ensures that the DC levels of the stabilised supply lies symmetrically within the DC levels of the unstabilised supply.

As described in connection with FIG. 2, two limit switches S1 and S2 are provided in the artificial hand itself to stop the motor at the maximum permissible travel of the linkage to the fingers in either direction. These switches are connected in series with one another and with the motor 9, each switch comprising a changeover contact associated with a respective pair of diodes. Thus switch S1 has associated with its diodes D16 and D17 and switch S2 has associated with it diodes D18 and D19. In each limit condition one of the switches removes a short-circuit across one of its associated diodes, which is connected in series with the motor in a direction to oppose the driving current producing the movement; simultaneously the switch connects in parallel with the motor the second associated diode, which is connected in a direction to allow the back-EMF of the motor to provide dynamic braking. Only reverse travel is now possible until the limit switch is disengaged.

We claim:

1. In a prosthetic device having a prosthetic limb and a control system for actuating said limb wherein the improvement resides in the control system comprising, means for deriving a control signal from EMG signals, drive means, a closed loop feedback system in which the control signal is modified by a velocity feedback signal and a force feedback signal to obtain an error signal to operate the drive means, and switch means for rendering the drive means inoperative whenever the difference between the force feedback signal and the control signal is less than a predetermined amount.

2. The device as claimed in claim 1 in which clamp means are provided to limit the maxima of the force feedback signal and the control signal to similar values whereby to prevent operation of the drive means in the event of an excessive force being applied.

3. The device as claimed in claim 1 including power supply means for energizing the drive means and in which a low voltage discriminator is provided to open the switch means when the supply voltage to the drive means falls below a predetermined value.

4. In a prosthetic device having a prosthetic limb and a control system for actuating said limb in response to EMG signals comprising electrode means for obtaining EMG signals from two different muscles, separate rectifying and smoothing means for the EMG signals so obtained, a differencing circuit for deriving a control signal from the two rectified and smoothed signals, drive means for actuating the prosthetic limb, velocity feedback signal generating means coupled with the drive means, force feedback signal generating means coupled with the prosthetic limb, a summing junction for obtaining an error signal representing the excess of the control signal over both the velocity feedback signal and the force feedback signal, the error signal functioning to cause operation of the drive means, and means for rendering the drive means inoperative whenever the difference between the force feedback signal and the control signal is less than a predetermined amount.

5. The device as claimed in claim 4 in which individual backlash circuits are included to which the rectified and smoothed EMG signals are applied and which serve to eliminate random fluctuations of less than predetermined proportions of such signals.

6. The device as claimed in claim 4 in which the means for rendering the drive means inoperative includes a further summing junction for obtaining a signal representing the difference between the control signal and the force feedback signal, and gating means for the error signal controlled by the output of the further summing junction.

7. The device as claimed in claim 6 in which a Schmitt trigger is provided to control the gating means, the Schmitt trigger being reset when the output from the further summing junction falls below a predetermined value.

8. The device as claimed in claim 7 including battery means for energizing the drive means and in which a low voltage discriminator connected to the battery energising the drive means is provided which resets the Schmitt trigger when its input voltage falls below a predetermined value.

References Cited

UNITED STATES PATENTS 3,026,534  3/1962  Brown _____ 3—127

FOREIGN PATENTS 163,718  1/1965  U.S.S.R.

OTHER REFERENCES

"Muscle Voltages Moves Artificial Hand," Electronics, vol. 36, Oct. 11, 1963, pages 34–36.

"Muscle Substitutes and Myo-Electric Control," by A. Bottomley et al., Radio and Electronic Engineer, vol. 26, No. 6, December 1963, pages 439–448.

"An Artificial Hand Controlled by the Nerves," by A. Bottomley et al., New Scientist, vol. 21, No. 382, Mar. 12, 1964, pages 668–671.

RICHARD A. GAUDET, *Primary Examiner.*

RONALD L. FRINKS, *Assistant Examiner.*

U.S. Cl. X.R.

3—12.7